United States Patent
LaFond et al.

(10) Patent No.: US 8,801,880 B2
(45) Date of Patent: *Aug. 12, 2014

(54) FORMATION OF A FABRIC SEAM BY ULTRASONIC GAP WELDING OF A FLAT WOVEN FABRIC

(75) Inventors: John J LaFond, Appleton, WI (US); Jennifer L Bowden, Pittsville, WI (US); Lynn F Kroll, Sherwood, WI (US); Joseph Botelho, Lincoln, RI (US)

(73) Assignee: Albany International Corp., Albany, NY (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/853,002

(22) Filed: Aug. 9, 2010

(65) Prior Publication Data

US 2010/0323148 A1    Dec. 23, 2010

Related U.S. Application Data

(62) Division of application No. 11/899,232, filed on Sep. 5, 2007, now Pat. No. 7,794,555.

(51) Int. Cl.
*B32B 37/00* (2006.01)

(52) U.S. Cl.
USPC .............. 156/64; 156/73.1; 156/73.4; 156/93; 156/157; 428/58; 428/102

(58) Field of Classification Search
USPC ........ 428/57, 58, 102; 156/64, 73.1, 73.4, 91, 156/92, 93, 157, 502, 544, 580.1, 580.2; 264/442, 443, 444

See application file for complete search history.

(56) References Cited

U.S. PATENT DOCUMENTS

| | | |
|---|---|---|
| 3,973,064 A | 8/1976 | Paine |
| 4,032,382 A | 6/1977 | Obeda |
| 4,156,626 A | 5/1979 | Souder |

(Continued)

FOREIGN PATENT DOCUMENTS

| | | |
|---|---|---|
| CA | 2552009 | 2/2007 |
| DE | 39 21 712 C | 9/1990 |

(Continued)

OTHER PUBLICATIONS

International Search Report and Written Opinion issued by European Patent Office for International Application PCT/US2008/074388, mailed Jan. 1, 2009 (corresponding to U.S. Appl. No. 11/899,232).

(Continued)

*Primary Examiner* — James Sells
(74) *Attorney, Agent, or Firm* — Frommer Lawrence & Haug LLP; Ronald R. Santucci (57) ABSTRACT

The invention relates to ultrasonic gap welding of flat woven fabrics. Specifically, the invention relates to a method of ultrasonic welding the seam termination yarn ends of a fabric using a controlled gap. A mechanical stop may be employed to control the distance or gap between the horn and anvil to a predetermined level based on the depth of welding and amount of weld energy. By adding another degree of control, the ultrasonic gap welding technique of the present invention is able to achieve fabric seams that are stronger than conventional seams, and even those enhanced with gluing, and is conducive to formation of fabric seams by spot welding or along the termination yarn ends of the fabric.

20 Claims, 7 Drawing Sheets

(56) References Cited

U.S. PATENT DOCUMENTS

| | | | |
|---|---|---|---|
| 4,311,172 A * | 1/1982 | Eckstein | 139/383 AA |
| 4,401,137 A | 8/1983 | Cannon | |
| 4,501,782 A | 2/1985 | Weatherly et al. | |
| 4,713,132 A | 12/1987 | Abel et al. | |
| 4,838,964 A * | 6/1989 | Thomsen et al. | 156/73.1 |
| 4,906,320 A | 3/1990 | Powers | |
| 5,170,031 A | 12/1992 | Russell et al. | |
| 5,204,150 A | 4/1993 | Davenport | |
| 5,334,289 A | 8/1994 | Trokhan et al. | |
| 5,391,419 A | 2/1995 | Davenport | |
| 5,464,488 A | 11/1995 | Servin | |
| 5,501,759 A | 3/1996 | Forman | |
| 5,554,467 A | 9/1996 | Trokhan et al. | |
| 5,571,590 A | 11/1996 | Schultz et al. | |
| 5,624,790 A | 4/1997 | Trokhan et al. | |
| 5,670,230 A | 9/1997 | Schlueter, Jr. et al. | |
| 5,674,663 A | 10/1997 | McFarland et al. | |
| 5,686,639 A | 11/1997 | Cohen | |
| 5,693,187 A | 12/1997 | Ampulski et al. | |
| 5,711,847 A | 1/1998 | Rajala et al. | |
| 5,713,399 A | 2/1998 | Collette et al. | |
| 5,721,032 A | 2/1998 | Parker et al. | |
| 5,731,063 A | 3/1998 | Schultz et al. | |
| 5,740,314 A | 4/1998 | Grimm | |
| 5,783,377 A | 7/1998 | Mee et al. | |
| 5,837,103 A | 11/1998 | Trokhan et al. | |
| 5,840,147 A | 11/1998 | Grimm | |
| 5,843,265 A | 12/1998 | Grimm | |
| 5,871,887 A | 2/1999 | Trokhan et al. | |
| 5,888,915 A | 3/1999 | Denton et al. | |
| 5,939,176 A | 8/1999 | Yook | |
| 6,099,670 A | 8/2000 | Louks et al. | |
| 6,162,518 A | 12/2000 | Korfer | |
| 6,517,650 B2 | 2/2003 | Couillard et al. | |
| 6,547,903 B1 | 4/2003 | McNichols et al. | |
| 6,547,904 B1 | 4/2003 | Young | |
| 6,702,927 B2 | 3/2004 | Moriarty et al. | |
| 6,763,855 B2 | 7/2004 | Rougvie | |
| 7,220,340 B2 | 5/2007 | Best | |
| 7,384,513 B2 | 6/2008 | Eagles | |
| 7,393,434 B2 | 7/2008 | Kornett | |
| 7,794,555 B2 * | 9/2010 | LaFond et al. | 156/64 |
| 2003/0111157 A1 | 6/2003 | Ehlert et al. | |
| 2003/0221739 A1 | 12/2003 | Billings | |
| 2004/0056006 A1 | 3/2004 | Jones et al. | |
| 2004/0126569 A1 | 7/2004 | Davenport et al. | |
| 2005/0102763 A1 | 5/2005 | Eagles | |
| 2006/0169387 A1 | 8/2006 | Nayar et al. | |
| 2007/0028997 A1 | 2/2007 | Best | |
| 2007/0235155 A1 | 10/2007 | Best et al. | |

FOREIGN PATENT DOCUMENTS

| | | |
|---|---|---|
| DE | 20 2006 004 624 U1 | 7/2006 |
| EP | 0 947 623 A | 10/1999 |
| FR | 2 874 188 A | 2/2006 |
| GB | 2232637 | 12/1990 |
| JP | 09-207223 | 8/1997 |
| WO | WO 96/40517 A | 12/1996 |
| WO | WO 99/16964 A | 4/1999 |
| WO | WO 99/53237 A | 10/1999 |
| WO | WO 00/02723 A | 1/2000 |
| WO | WO 01/58997 A | 8/2001 |
| WO | WO 02/38677 A | 5/2002 |
| WO | WO 02/057353 A | 7/2002 |
| WO | WO 2004/055265 A | 7/2004 |
| WO | WO 2006/074105 A | 7/2006 |

OTHER PUBLICATIONS

International Search Report and Written Opinion issued by European Patent Office for International Application PCT/US2008/074312, mailed Mar. 10, 2009 (corresponding to U.S. Appl. No. 11/899,245).

Clear weld "The Concept" and Clearweld "The Clear Advantage, Clearweld Material Systems", pages from website www.clearweld.com (3 pages in total).

IPAC "Near, Mid & Far Infrared" pages from website www.ipac.caltech.edu (5 pages in total).

Backmann, Reinhard: "Textilschweiβen—Thermisches Fügen und Verbinden von Textilien für Orthopädie- und Medizintechnik",Jan. 2004, retrieved from the Internet URL:http://www.grin.com/e-book/111374/textilschweissen-thermisches-fuegen-und-verbinden-von-textilien-fuer-orthopaedie, (retrieved on Nov. 10, 2008), total 21 pages (in German).

Anonymous: "High Frequency Technology", Aug. 10, 2003, retrieved from the Internet URL:http://web.archive.org/web/20030810015427/http://rfwelding.com/hpage07.htm, (retrieved on Nov. 10, 2008), total 5 pages (in English).

"Schneiden Schweissen und Siegeln Mittels Utraschall-Beruehrungslos und Verschleissfrei", *Deutscher Drucker*, Sep. 21, 1995, No. 35, p. G29 (in German).

* cited by examiner

FORMATION OF A FABRIC SEAM BY ULTRASONIC GAP WELDING OF A FLAT WOVEN FABRIC

CROSS REFERENCE TO RELATED APPLICATIONS

This application is a division of U.S. patent application Ser. No. 11/899,232, filed Sep. 5, 2007 entitled "Formation of a Fabric Seam by Ultrasonic Gap Welding of a Flat Woven Fabric", which was granted as U.S. Pat. No. 7,794,555 on Sep. 14, 2010, the disclosure of which is incorporated herein by reference.

FIELD OF THE INVENTION

The present invention relates to the formation of a fabric seam for a flat woven fabric using a unique ultrasonic welding technique known as ultrasonic gap welding.

INCORPORATION BY REFERENCE

All patents, patent applications, documents and/or references referred to herein are incorporated by reference, and may be employed in the practice of the invention.

BACKGROUND OF THE INVENTION

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics, sometimes referred to as paper machine clothing (PMC), all take the form of endless loops on the paper machine and function in the manner of conveyors. It should further be appreciated that paper manufacture is a continuous process, which proceeds at considerable speeds. That is to say, the fibrous slurry is continuously deposited onto the forming fabric in the forming section, while a newly manufactured paper sheet is continuously wound onto rolls after it exits from the dryer section.

Flat woven fabrics can also be formed into engineered fabrics. Whether the flat woven fabric is a forming, press, dryer, through-air-drying (TAD) or an engineered-fabric, used, including but not limited to, to produce nonwovens by processes such as spunbonding or hydroentangling, or for wet processes such as a DNT belt or sludge filter belt or the like, or textile finishing belts, the properties of seam uniformity and integrity are critical.

Fabric seam terminations or the ends of the yarns that are interlaced or interwoven to form the seam are susceptible to pulling back when run on a paper, TAD or other industrial machines when the fabric is subjected to machine direction (MD) tension. To minimize this seam "pullback", the terminal ends of the yarns in the seam are sometimes bonded to an adjacent yarn with an adhesive. However, adhesives are not fully resistant to the machine running conditions, and still allow for pullbacks or yarn slippage to occur over time. Likewise, the use of adhesives with other reinforcement means such as sewing terminal ends of a PMC, TAD or engineered fabric does not produce the desired seam integrity or uniformity.

In addition, the width of the seam area, as measured in MD, formed using conventional techniques typically range, for example, anywhere between three and one half to twenty inches or even more. For many reasons, it is desirable to reduce the seam area.

Figure 1A:
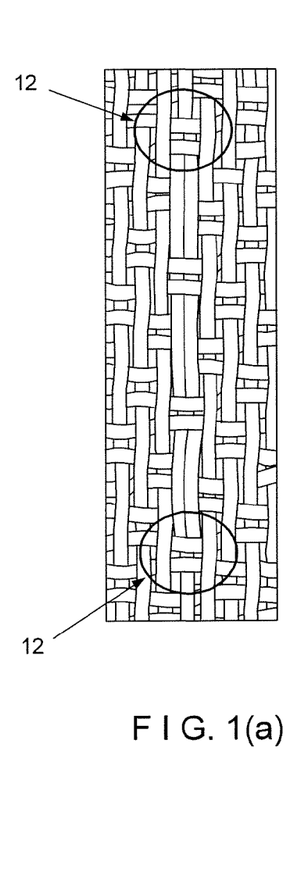
FIG. 1(a)-1(d) depict the problems associated with conventional seam formation.
Figure 1B:
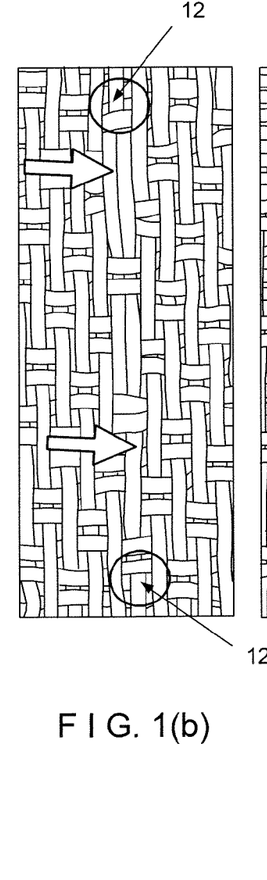
Figure 1C:
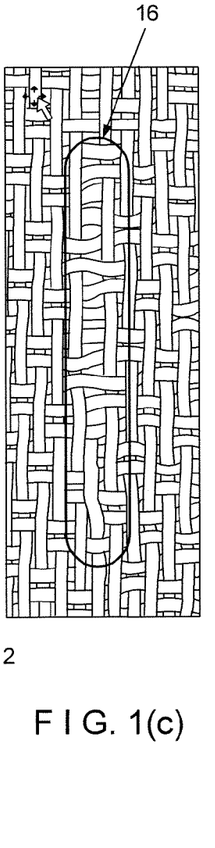
Figure 1D:
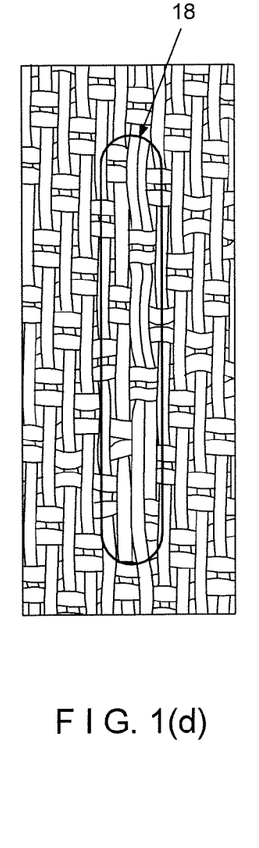

FIGS. 1(a-d) show the problems associated with conventional seam formation techniques, wherein the terminating ends of the two fabric edges are "overlapped" in the seam area and the critical points 12, where these ends might "pullback" in the MD and the ends themselves might protrude through the paper side surface, are identified (FIG. 1a). Eventually, the slippage in the overlapping area increases as shown by the arrows due to increased localized stresses in the fabric (FIG. 1b) and there is a complete slippage and a hole 16 appears in the seam area of the fabric (FIG. 1c). Accordingly the overlap region of the seam is typically reinforced by manually gluing 18 (FIG. 1d) to increase its strength; however, gluing is a laborious and time consuming process. Due to its low precision, it is also hard to limit the glue to only the overlapping yarns. In addition, the glue eventually either fails due to flexing of the fabric and/or abrasion.

Accordingly, there is a need for a different or improved means of strengthening seam yarn end terminations, and consequent seam strength.

A possible technique for strengthening seam yarn end terminations for fabrics is welding, such as ultrasonic welding. Ultrasonic refers to sounds that are above the range of human hearing, i.e. >20,000 Hz and ultrasonic welding refers to the fusing of materials with sound waves. However, unacceptable seam formation results often arise from ultrasonic welding such as excessive melting of the yarns, reduced seam permeability, and distortions in the fabric due to localized shrinkage.

Other seaming methods can be found in the following references:

U.S. Pat. No. 4,032,382 relates to a method and apparatus for splicing thermoplastic monofilament material. Two filaments are joined together in a channel in an apparatus. They are exposed to high frequency vibrations under lateral pressure in the channel, which dimension corresponds to the original diameter of the filaments. The outcome is a splice with a diameter close to the original material.

U.S. Pat. No. 4,401,137 relates to a forming fabric with a non-marking looped pin seam with trimmed "tails" which may then be ultrasonically welded to increase the strength of the seam.

U.S. Pat. No. 4,501,782 relates to an alternative method to join the fringed fabric warp ends in a completely rigid manner. The warp ends are put in interdigitated position and ultrasonically bonded in a continuous manner across the fabric. The seam joint claims to have the same caliper as the main body of the fabric after this operation.

However, this seam is not acceptable for the demands in papermaking as it causes marks in the paper and/or gives uneven drainage. The risk for paper web breakage is high if such seam is used for a TAD fabric as the tissue web is so thin.

U.S. Pat. No. 5,464,488 relates to a method for forming a strong and flexible bond between two plastic fabric layers that requires the controlled use of an ultrasonic welding apparatus. The yarns are said to soften, but not melt, and bind to each other during this process. The bond becomes flexible and useful as it is not brittle, and consequently not susceptible to the cracking and breakage in the bonds presented in the prior art.

However, this seam is not useful in open structures like TAD fabrics. A seam more like that of the traditional seams with properties close to the main body of the fabric is essential for the performance. The proposed seam is of that improved kind.

U.S. Pat. No. 5,571,590 provides papermaking fabrics with cross machine direction ("CD") seams formed by superposed end portions of a flat woven substrate element with end portions extending away from the ends in a common direction; concurrently the ends are severed from the end portions, and the end potions are fuse bonded along a common cut line.

U.S. Pat. No. 5,713,399 provides a PMC manufactured by spirally winding a woven fabric strip narrower than the intended width of the fabric. The strip has a lateral fringe of unbound ends of crosswise yarns on at least one lateral edge. This fringe underlies or overlies the edge of the adjacent turn of the strip. The spirally continuous seam so obtained is closed by ultrasonic welding.

U.S. Pat. No. 5,731,063 provides papermaking felts with cross machine direction seams formed by end portions of a flat woven substrate element with end portions extending away from the ends in a common direction. Concurrently the ends are severed from the end portions, and the end portions are fuse bonded along a common cut line, similar to U.S. Pat. No. 5,571,590.

U.S. Pat. No. 6,162,518 relates to a spirally wound PMC similar to U.S. Pat. No. 5,713,399. At least one connecting thread is placed over the projecting thread sections of the edges before the heat bonding is initiated.

U.S. Pat. No. 6,702,927 relates to a PMC manufactured by spirally winding a woven fabric strip narrower than the intended width of the PMC. The fabric strip has first and second lateral edges, along which are a first and second lip, respectively. Each lip has at least one lengthwise yarn woven with crosswise yarns. Adjacent to and inward of the first and second lips are a first and second gap, respectively, which lack lengthwise yarns but whose crosswise yarns join the lips to the body of the strip. When spirally wound the lips overlay the gaps of adjacent turns to form a seam which may be closed by ultrasonic bonding or other means.

Published U.S. Patent Application No. 2003/0221739 relates to a PMC using at least one preformed loop or coil in a pin seam joining the ends of the fabric to form an endless belt. The ends of the base fabric may be pre and/or post treated by compaction, pre-squeezing and sealing to stabilize the ends. Ultrasonic melting or other means may be used also to reinforce and provide a smooth surface in the stitched area.

While ultrasonic welding has several advantages over conventional seam formation techniques such as sewing or gluing, certain drawbacks of previous ultrasonic welding techniques described above stemmed in part from the fact that conventional ultrasonic welding is based on modifying multiple parameters of time, energy and distance. Therefore, there is still a need in the art for a means of creating fabric seams with acceptable surface smoothness and strength which is also easy to use and applicable to a broad range of fabric types.

Note that citation or identification of any document in this application is not an admission that such document is available as prior art to the present invention.

SUMMARY OF THE INVENTION

The invention relates to a method of creating a seam in a flat woven industrial fabric such as a PMC fabric, a through-air-dryer (TAD) fabric, an engineered fabric, a fabric/belt used for textile finishing processes such as conveying or a tannery belt. The method involves ultrasonic welding herein described as ultrasonic gap welding comprising the steps of setting the distance between a horn and an anvil, placing the material to be welded between the horn and anvil; and welding a portion of that material using ultrasonic energy until the stop is reached then continuing to weld at that gap with no further loss of caliper for a predetermined length of time or until a predetermined amount of energy is absorbed.

An objective of the instant invention is to form consistent bonds between yarns that are stronger than just the conventional seaming method. Another objective of the instant invention is to form better seam integrity within the fabric, with the seam area that is welded being narrower in the MD than a corresponding conventional seam, even one enhanced by gluing.

Another object of the invention is to form a fabric having a stronger and/or more durable seam for the same length seam in the MD. Preferably, the seam width as measured in the MD is a fraction of the width of a normal seam or a seam that is formed using a conventional technique of equal strength. This fraction can be 0.7 or lower, preferably 0.5 or lower, and most preferably 0.3 or lower. For example, if "X" is the width of a seam in MD according to prior practice, or a conventional seaming method, then the width of the seam formed according to the instant invention is, for example, 0.7X or lower, preferably 0.5X or lower, and most preferably 0.3X or lower whilst being of equal strength.

Yet another object of the invention is to enhance pin seams and inline spiral seams such as used in industrial fabrics, such as papermaking clothing especially dryer fabrics, using the ultrasonic gap welding technique of the present invention. Pin seams, which also require reweaving of MD yarns into the fabric body and thus have the potential to fail due to yarn slippage and pull out, can also be improved by the ultrasonic welding technique described herein. In such seams, the MD yarns which form the seam loops themselves can be welded or fused to the CD yarns to prevent them from pulling out under operating tensions in use.

By eliminating the shortcomings associated with conventional ultrasonic welding, the ultrasonic gap welding technique of the present invention is able to achieve smooth fabric seams with sufficient strength and is conducive to the formation of fabric seams by spot welding or along the termination ends of the fabric.

The invention also relates to the formation of a fabric seam by ultrasonic gap welding that comprises setting a mechanical stop to control a distance between the tip of the horn and an anvil, aligning the terminal yarn ends of a flat woven seamed and joined fabric, placing the aligned terminal yarn ends in the seam between the horn and the anvil, adjusting the distance between the horn and the anvil to a fixed, predetermined gap and welding the terminal yarn ends of the fabric with ultrasonic energy at that gap distance, with no further loss of yarn or fabric caliper, for a predetermined length of time or until a predetermined amount of energy is absorbed by the yarns.

The invention encompasses a method of minimizing terminal yarn end pullback and seam end termination wear in a fabric comprising ultrasonic welding of seam terminal ends of the fabric.

The invention also relates to a process of welding together the two ends of adjacent warp yarns of a fabric either to each other and/or to the CD yarn that they cross over, using the method with minimal to no warp yarn overlap as described herein.

BRIEF DESCRIPTION OF THE DRAWINGS

The present invention will now be described in more complete detail with reference being made to the figures wherein like reference numerals denote like elements and parts, which are identified below.

DETAILED DESCRIPTION OF THE INVENTION

The present invention relates to a method of ultrasonic welding herein described as ultrasonic gap welding, comprising the steps of controlling the depth of the weld by for example setting a mechanical stop or utilizing other means to control a distance between a horn and an anvil, placing the material to be welded between the horn and anvil; and welding a portion of that material using ultrasonic energy until the horn reaches the predetermined depth or gap then continuing to weld at that gap distance, with no further loss of yarn caliper for a predetermined length of time or until a predetermined amount of energy is absorbed.

During gap welding, a mechanical stop (not shown) may be used to control the closest distance the horn can get to the anvil. In other words, the mechanical stop dictates the depth to which the ultrasonic horn can penetrate into the fabric being welded. This distance between the horn and anvil is the gap. Once the horn reaches a mechanical stop, it continues to weld at that gap for whatever time or energy specified with no further loss of yarn or fabric caliper. The material is being held under compression when the ultrasonic energy is applied. This prevents yarn collapse and allows for more energy to be put into the weld without over-welding, caliper reduction, overheating and is less likely to cause a loss of yarn material properties such as molecular orientation. For instance, if a fabric caliper is 1.0 mm, a mechanical stop could be set to leave a gap of 0.4 mm between the horn tip and anvil. The horn would then be welding 0.6 mm into the fabric. This allows an increase in the amount of energy in the weld using either a time or energy mode. The task, however, is to control the depth of penetration of the horn or the depth of penetration of the anvil. In either case, the gap between the anvil and the horn tip determines the depth of the weld and the strength of the weld thus formed. The gap also must be calculated to take into consideration the amplitude of the horn movement (vibration).

Figure 2A:
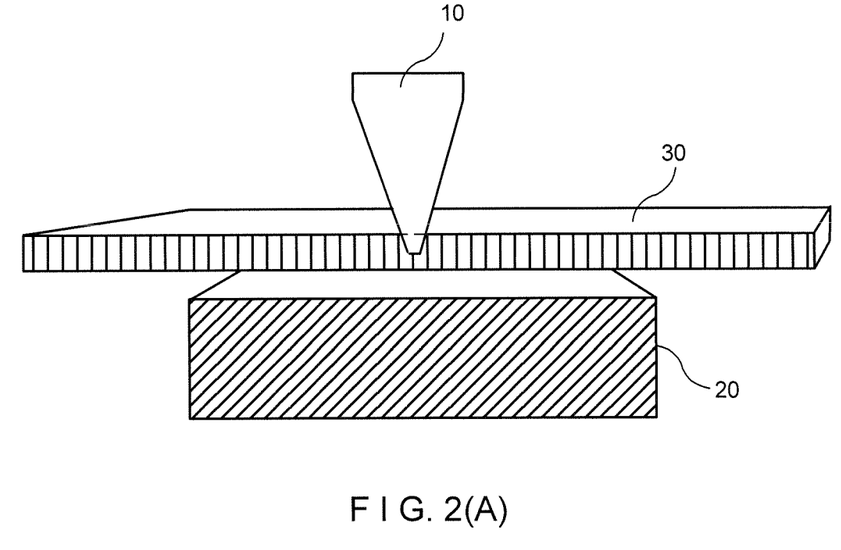
FIG. 2(A) illustrates a method of ultrasonic gap welding according to an embodiment of the present invention.
Figure 2B:
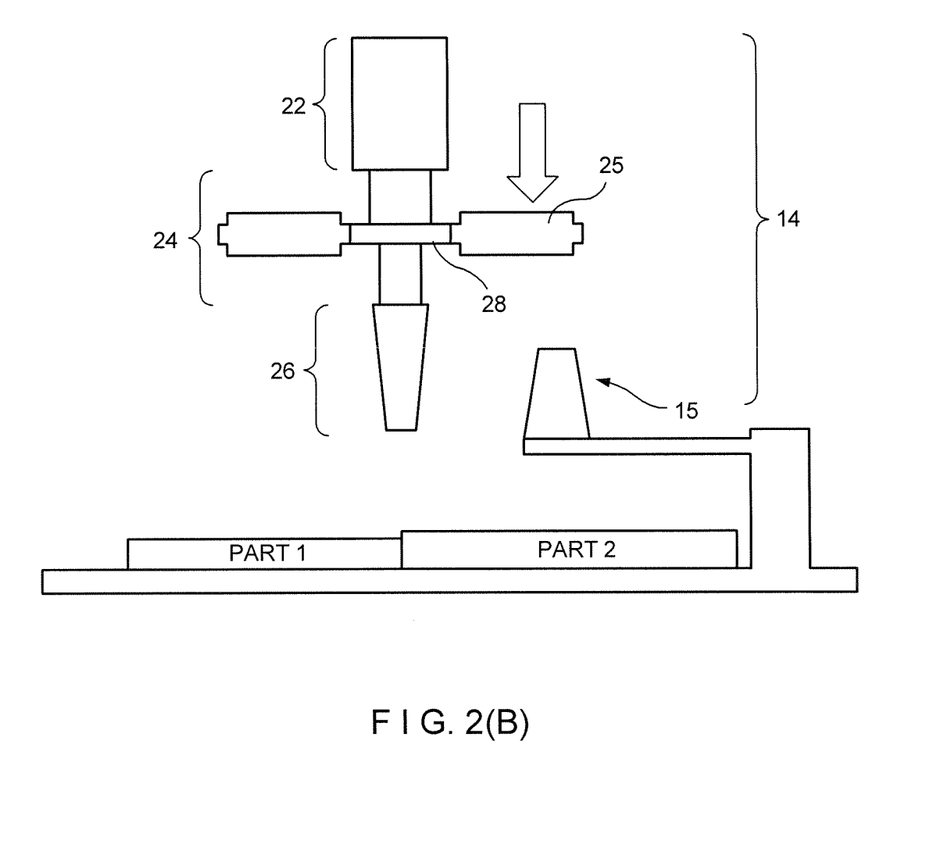
FIG. 2(B) illustrates a method of ultrasonic gap welding according to an embodiment of the present invention.

FIG. 2(A) shows ultrasonic gap welding according to one embodiment of the present invention. In this regard the ultrasonic horn 10 which uses high frequency ultrasonic energy to weld the fabric is applied. An anvil 20 is used as a support means, on which is placed the fabric 30 that is being welded. The ultrasonic horn 10 is lowered to a predetermined level based on the caliper thickness of the fabric being welded and the depth to which the weld is required. FIG. 2(B) is a further depiction of a device used in ultrasonic welding of the present invention. The device comprises an ultrasonic welder or what is generally referred to as an ultrasonic stack 14 (or acoustic stack) in the art. The stack 14 consists of three parts, namely the converter 22, booster 24 and the horn 26. A ring 28 around the booster is where the stack 14 is clamped within the stack holder 25. A mechanical stop 15 is set so that the stack holder 25 or clamp holding the neutral point of the stack or ring of the booster is prevented from moving downward any further from a point that is desired. When the ultrasonic welder is ON, the tip of the horn vibrates at certain amplitude above and below this set point. However, when the ultrasonic welder is OFF, then the mechanical stop 15 is what sets a fixed distance between the horn 10 and anvil 20. For example, if parts 1 & 2 are to be welded together, the stop 15 is set to a predetermined height based on the caliper of the parts and the depth of weld desired. When the stack 14 starts moving downwards, the ultrasonic tip is OFF, and soon after the horn contacts the samples, a predetermined load value is reached. This load is measured by a pressure sensor, such as a load cell for example, mounted on the stack housing. At this point the ultrasonic energy is turned ON. It is to be noted that at this point the stack housing (represented here by the ring 28 of the booster 24 which is clamped into it) has not contacted the stop 15. As welding continues, the heat generated by welding combined with the downward pressure of the horn on the parts causes the caliper of the material in the weld area to be reduced until the stack housing 25 hits the stop 15, thus preventing any further reduction in yarn or fabric caliper. The ultrasonic energy, however, remains ON and continues to weld. After the ultrasonic energy is turned OFF, the welded parts are typically held under pressure for a predetermined amount of time to enable them to cool and solidify together, which gives improved physical properties such as strength to the weld area. The stack 14 then retracts, and the gap weld is complete.

Standard welding is controlled using time, energy or distance. For example, once a specific trigger force has been met, the machine welds for a set amount of time, or to a set amount of energy, or down a certain distance into the fabric. The ultrasonic gap welding technique produces a stronger bond with an acceptable amount of yarn distortion and allows for consistent welding over the entire width of the fabric because all the parameters for welding have been fixed, as well as adding an additional degree of control which makes for a much more robust process with a larger window of acceptable processing condition.

Figure 3:
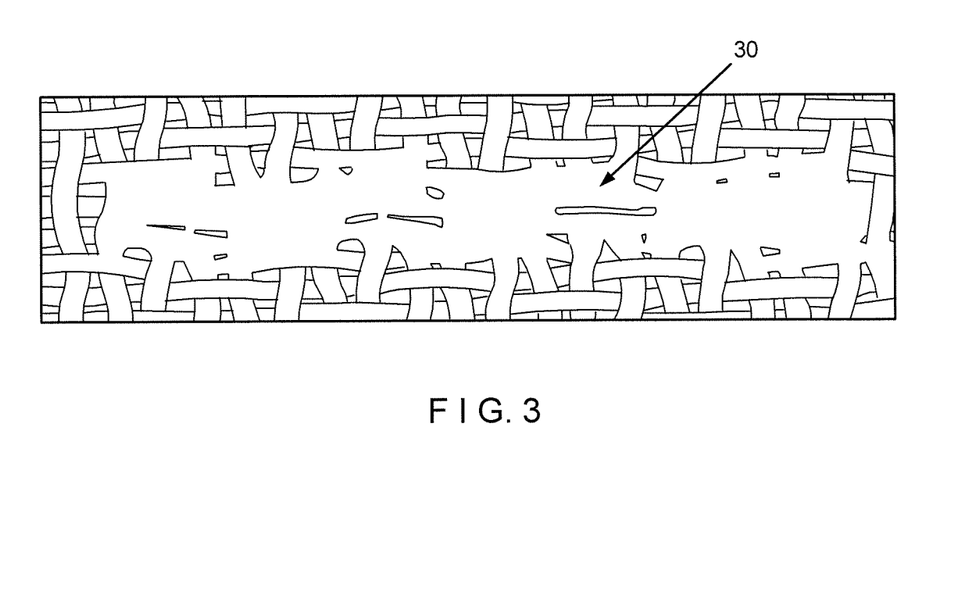
FIG. 3 is an example of fabric prepared using the ultrasonic gap welding according to one aspect of the present invention.
Figure 4:
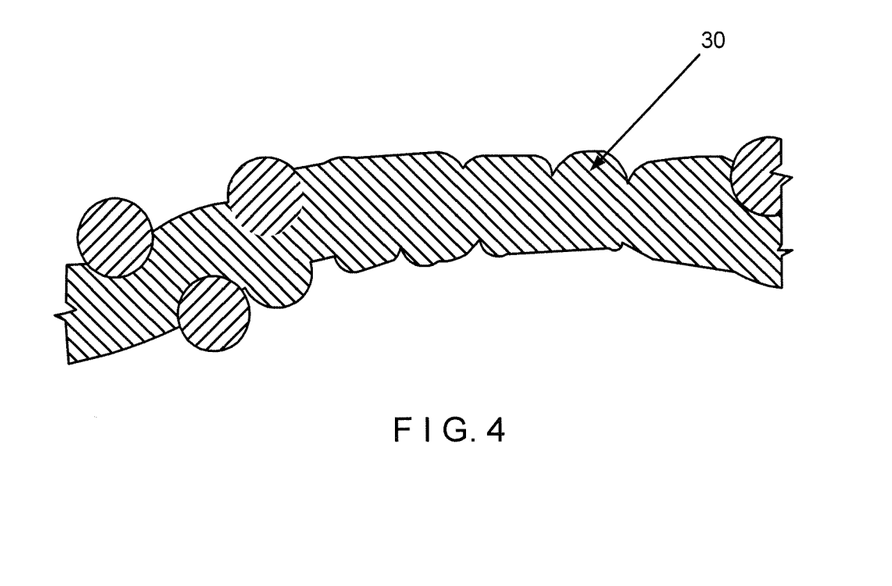
FIG. 4 is a cross-sectional view of a fabric in accordance with an embodiment of the present invention.

The present invention has particular application in creating a seam in a flat woven industrial fabric such as PMC, a TAD fabric, an engineered fabric, or a fabric/belt used for textile finishing processes such as calendering or a hide tanning belt. Other applications are, however, possible. In this regard, in FIG. 3 is an example of a fabric 30 welded using the ultrasonic gap welding technique according to the present invention. The welding occurred where the terminal yarn ends are located within the woven seam of the fabric. Some fabrics have 10,000 or more such terminal yarn ends. A cross-sectional view of the fabric 30 is seen in FIG. 4 showing the welded terminal yarn ends as well as welding to the CD yarns. The fabric 30 welded therein had a caliper of 0.9 mm and the gap between the anvil and the ultrasonic horn was set to 0.4 mm. It can be observed from FIGS. 3 and 4 that the present technique renders both precision and caliper uniformity to the welding process.

The gap between the horn and anvil is also determined by the material that is to be welded. In one embodiment of the invention, the material to be welded is a fabric and the gap between the horn and the anvil is about 30% to about 55% of the fabric caliper thickness. In a further embodiment of the invention, the gap between the horn and the anvil is about 40% of the initial fabric caliper or thickness. Other gap distances suitable for the purpose are envisioned.

Note, in paper machine clothing, initial fabric thickness can range from about 0.5-3.5 mm. For engineered fabrics, initial thickness can range from about 0.8 mm to 6.0 mm or more.

Figure 5:
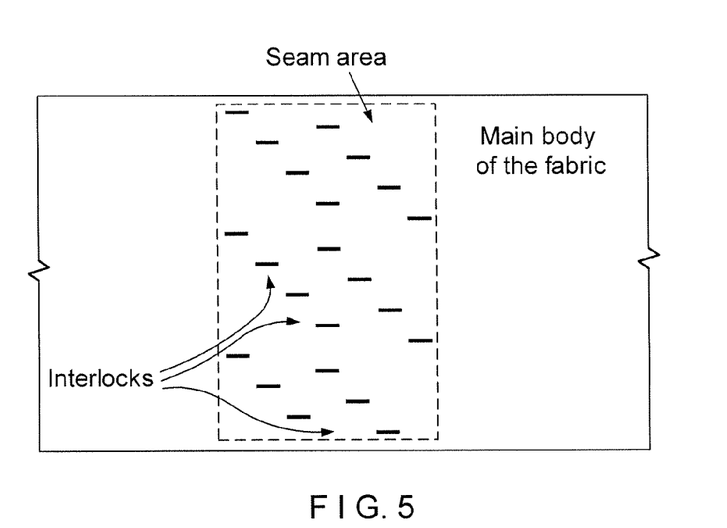
FIG. 5 is a diagram depicting the principle of seam and interlock position.

The actual length of each weld in the MD depends on the number of parallel knuckles in each interlock area and also the warp yarn and weft yarn dimensions and their densities (number and spacing) as seen for example in FIG. 5. This is, however, just an illustration of the principle of seam and interlock position. The actual pattern depends on the weave pattern in the main body of the cloth and the possible distribution of termination points correlates to that. The width of each weld depends also on the filament diameter and the warp or MD yarn spacing. The welds can be made as small as possible in order to maintain characteristics in the fabric and consequently in the paper or other product being produced.

Because of the nature of TAD fabrics, use of a TAD fabric is a preferred embodiment for the formation of a fabric seam thereof by way of the methods disclosed herein. The fabric seam is not folded back along itself; rather the fabric seam is like that of a traditional flat woven and seamed fabric where the terminal ends of the yarns of the fabric are woven into the opposite ends of the fabric as opposed to, for example, a pin seamed fabric.

Whether the flat woven fabric is a TAD or an engineered fabric, the properties of seam strength and uniformity and location of the terminal yarn ends on the back side or machine running side of the fabric are important for many products when used for their intended purpose.

Fabric seam terminations formed according to the instant invention could be of any length and/or width depending on the dimensions of the horn. Termination size could change with new products and also the fact that the goal is to make the terminations shorter and the seam area itself in the MD as short as possible. The result of the use of the instant ultrasonic welding method is a stronger and/or more durable seam for the same length of a conventional seam in the MD of the fabric. Preferably, the seam width as measured in the MD is a fraction of the width of a normal seam or a seam that is formed using a conventional technique of equal strength. This fraction can be 0.7 or lower, preferably 0.5 or lower, and most preferably 0.3 or lower. For example, if "X" is the width of a seam in MD according to prior practice, or a conventional seaming method, then the width of the seam formed according to the instant invention is, for example, 0.7X or lower, preferably 0.5X or lower, and most preferably 0.3X or lower whilst being of equal strength.

In one embodiment of the invention, the weld consists of only the two yarn terminations in each interlock and localized bonding to the CD yarns in the interlock region.

Note that the flat woven fabrics such as a TAD fabric and engineered fabrics typically comprise monofilament strands or yarns of polymers such as polyester, polypropylene, polyamide (nylon) and polyvinylidene fluoride (PVDF).

In a flat woven fabric the seam yarn end terminations are susceptible to pullback under machine running conditions as aforementioned. Standard adhesives used in bonding the seam yarn end terminations also allow to a certain degree yarn pullbacks to occur over time. Ultrasonic welding locks the seam ends with two or three times more strength than standard gluing methods. An acceptable ultrasonic weld results in up to 55% reduction in fabric thickness and a strong bond. However, unacceptable results can arise from welding too large an area, excessive melting of the yarn, and overall distortions in the fabric, so appropriate parameters are necessary.

Figure 7A:
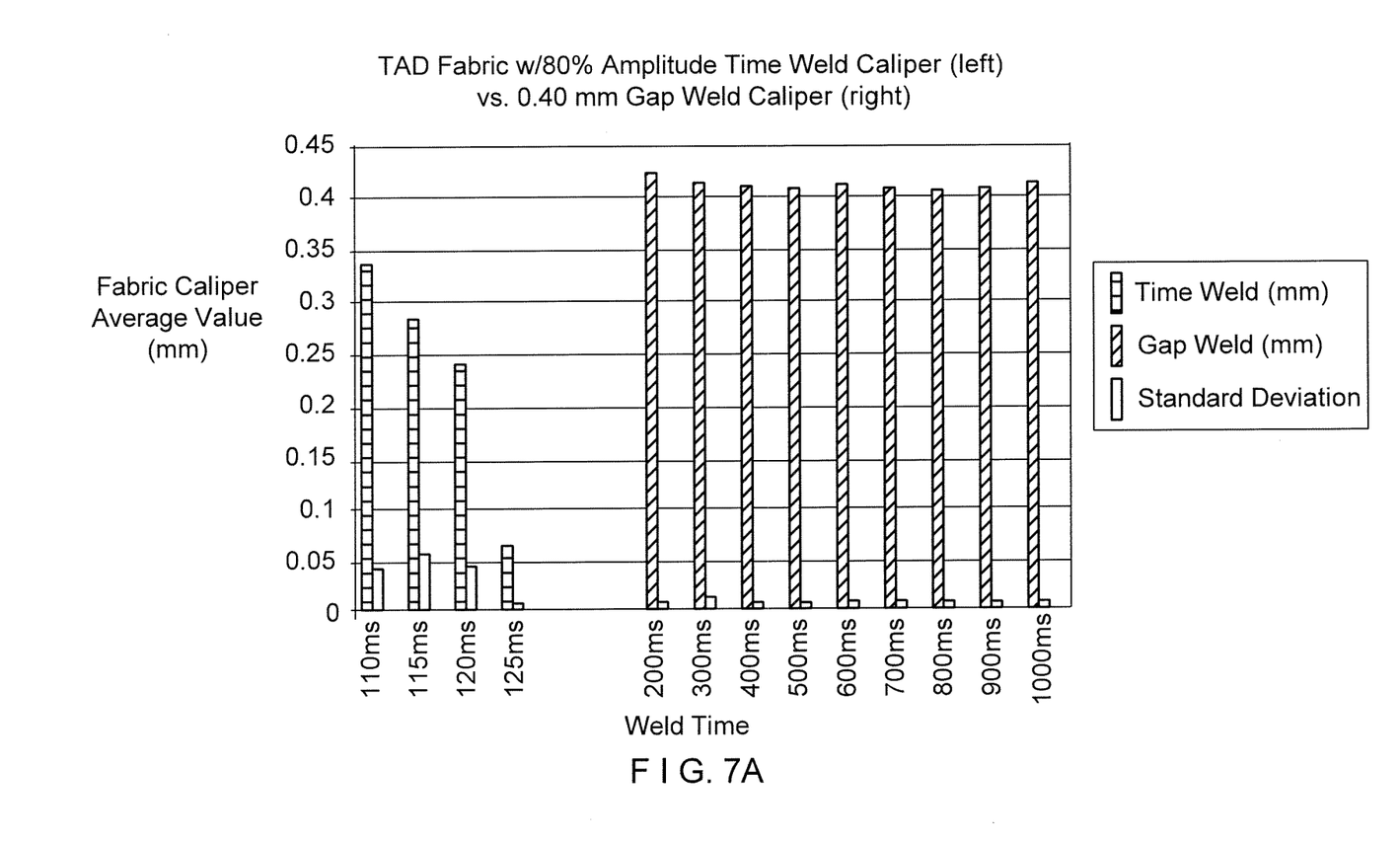
FIGS. 7A and 7B indicate retention of seam caliper and improved seam strength when using an embodiment of the invention.
Figure 7B:
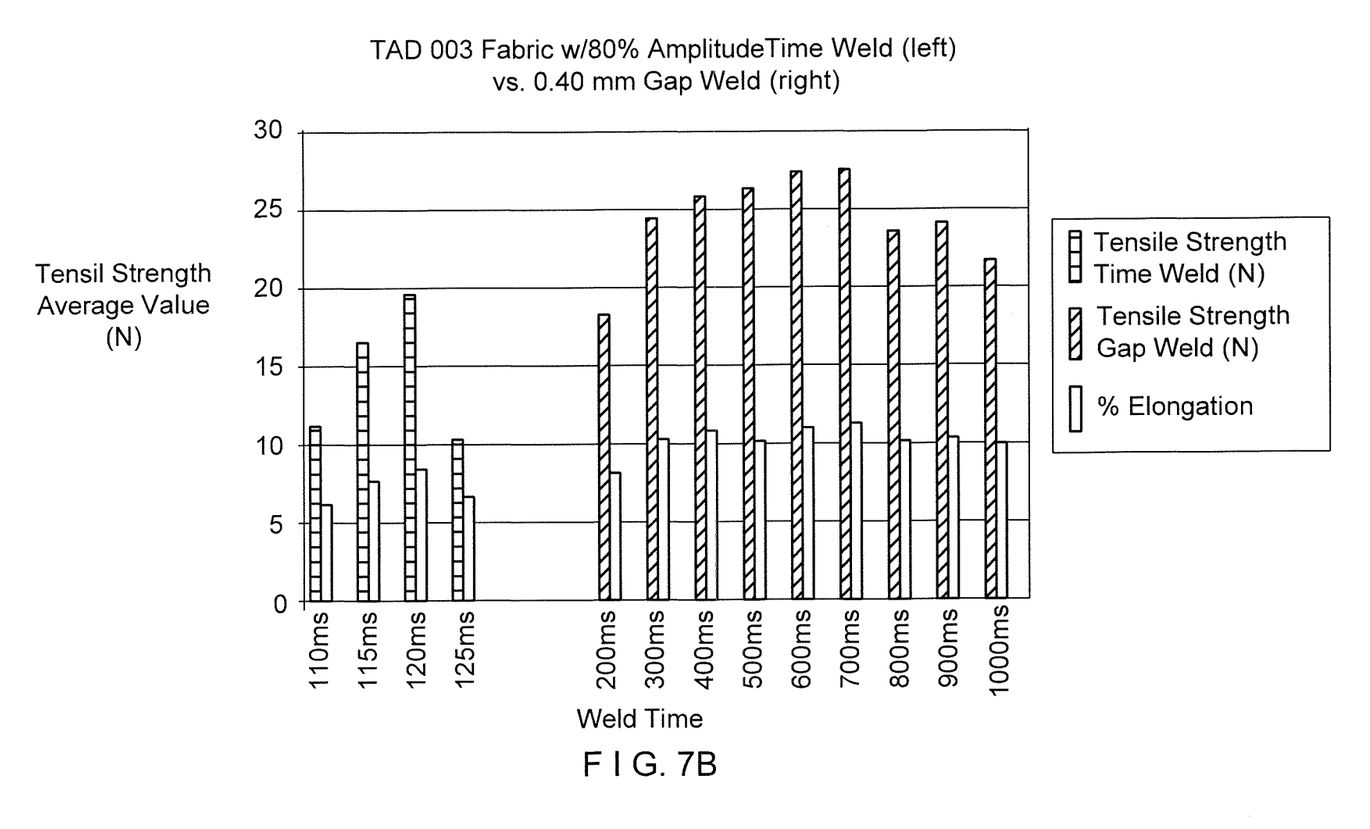

Note, the ultrasonic gap welding technique described herein produces a stronger fabric seam with an acceptable amount of distortion. For example, FIG. 7A demonstrates caliper or thickness retention of a TAD fabric over a period of time, at 80% amplitude of horn movement using a normal ultrasonic welding technique based on time and a 0.4 mm ultrasonic gap welding technique of the present invention. FIG. 7B compares the tensile strengths of the two fabrics formed by the two techniques, respectively. FIGS. 7A and 7B demonstrate the improved seam strength using the present ultrasonic gap welding technique, whereby fabric caliper or thickness is retained and the seam strength is improved.

Note further that the invention results in reducing seam yarn termination wear. The seam terminations often wear more quickly than the body of the fabric because they tend to stick out higher than the plane of the fabric. By bringing and keeping the terminations below the plane of the fabric, the ultrasonic gap welding methods described herein advantageously reduces the susceptibility of the yarn terminations to wear before the body of the fabric.

In addition, the invention encompasses a method of minimizing terminal seam end pullback of seam termination ends in a fabric comprising ultrasonic gap welding.

The present invention also relates to improving strength in a seam using the methods described herein. Seams formed by the ultrasonic gap welding process result in benefits of shorter (measured in the MD), stronger seams that reduce the potential for sheet marking of paper for example, or preventing terminal yarn ends to migrate that can cause holes in tissue/towel sheets.

The present invention also relates to improving the integrity of the seam. For example, when the fabric is in use, it is important that the seam area maintain its integrity while the fabric is running on a, for example, paper tissue, or towel machine. Every yarn end termination is crucial and the proposed process can be applied to specific yarns in specific places in a predetermined pattern. As a result of the method, it is a possibility to make the seam yarn terminations less vulnerable to failure compared to glued yarn terminations. For example, the seam yarn termination area can be made with lower caliper than the original fabric as desired. Maintaining the integrity of the fabric seam increases the useful running life of the fabric. Although seams for flat woven fabrics have been discussed, the present ultrasonic welding technique can be applied to other types of seams, such as for example a pin seam, wherein the MD yarns which form the seam loops themselves can be welded or fused to the CD yarns to prevent them from pulling out under operating tensions in use, thus improving the seam strength and uniformity in stress or load distribution.

The invention will now be further described by way of the following non-limiting example.

EXAMPLE

Example 1

Using a 40 kHz ultrasonic gap welder, a TAD fabric was exposed to a 500 ms weld time and a 1 second hold time (i.e. after welding the horn stays in the welding position for 1 second before raising the horn) with a 40 micrometer amplitude. The gauge pressure on the seam area was 144 kPa and the trigger force (TRS) was 111 N.

The result of the process is a TAD fabric with strengthened seam yarn terminations (see FIG. 3), which experienced minimal terminal seam yarn pullback during a trial run on a paper machine. In addition, the resulting seam termination ends of the TAD fabric resulted in considerably more strength than seam gluing.

Figure 6:
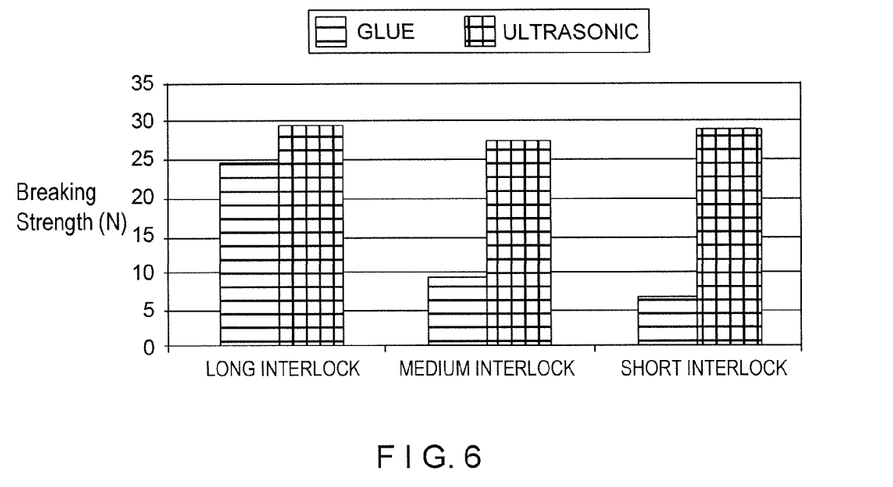
FIG. 6 compares the breaking strength of a conventionally glued fabric and fabric seams at different interlock lengths formed from the ultrasonic gap welding according to one embodiment of the present invention.

FIG. 6 compares the breaking strength of a fabric seam for different lengths on the interlocks for both glued and ultrasonically gap welded fabrics with seams. Evidently, the fabrics welded using ultrasonic gap welding of the present invention have higher strength than that of a conventionally glued fabric seam especially when the glued MD length of the interlock in the seam are medium or short.

Thus the present invention its objects and advantages are realized, and although preferred embodiments have been disclosed and described in detail herein, its scope and objects should not be limited thereby; rather its scope should be determined by that of the appended claims.

The invention claimed is:

1. A seam in an industrial fabric formed according to a method comprising the steps of:
    (a) seaming the industrial fabric into an endless form by weaving terminal yarn ends of one or more warp yarns and/or weft yarns into the industrial fabric to form a seam area;
    (b) placing the seam area of step (a) between a horn and an anvil;
    (e) adjusting the horn and/or the anvil to create a predetermined gap between the horn and the anvil; and
    (d) welding the terminal yarn ends of step (a) to an adjacent yarn and/or to a yarn that the terminal yarn ends cross over, by applying energy for a predetermined length of time or until a predetermined amount of energy is absorbed by the terminal yarn ends,
    wherein a depth of weld is determined by the predetermined gap between the horn and the anvil.

2. The seam according to claim 1, wherein the fabric is selected from the group consisting of PMC fabrics, TAD, engineered fabrics, and fabrics/belts used for textile finishing processes such as calendering and hide tanning.

3. The seam according to claim 1, wherein the gap between the horn and the anvil is between 30% and 55% of the initial thickness of the fabric being welded.

4. The seam according to claim 1, wherein the fabric is a flat woven fabric.

5. The seam according to claim 1, wherein the predetermined gap is controlled by a mechanical stop.

6. The seam according to claim 1, wherein the terminal yarn ends are welded together with minimal overlap.

7. The seam according to claim 1, wherein the welded seam area is stronger and/or more durable than a non-welded seam or a glued seam of equal length in MD of the fabric.

8. The seam according to claim 1, wherein a width of said seam as measured in MD is a fraction of a width of a non-welded seam or a glued seam, said fraction being 0.7 or lower, preferably 0.5 or lower, and most preferably 0.3 or lower.

9. The seam according to claim 1, wherein the terminal yarn ends are below the fabric plane.

10. The seam according to claim 1, wherein said seam is a pin seam or an inline spiral seam.

11. A method of selectively welding areas within a seam area of an industrial fabric, the method comprising the steps of:
    (a) providing a woven fabric having terminal yarn ends;
    (b) weaving the terminal yarn ends into the body of the fabric at discrete locations in the seam area, thereby seaming the woven fabric to take an endless form;
    (c) placing the seam area of step (b) between a horn and an anvil;
    (d) adjusting a distance between the horn and the anvil to a predetermined gap; and
    (e) welding The terminal yarn ends of step (b) to an adjacent yarn and/or to a yarn that the terminal yarn ends cross over, by applying energy for a predetermined length of time or until a predetermined amount of energy is absorbed by the terminal yarn ends,
    wherein a depth of weld is determined by the predetermined gap between the horn and the anvil.

12. The method of claim 11, wherein the fabric is selected from the group consisting of PMC fabrics, TAD, engineered fabrics, and fabrics used for textile finishing processes such as calendering and hide tanning.

13. The method of claim 11, wherein the gap between the horn and the anvil is between 30% and 55% of the initial thickness of the fabric being welded.

14. The method of claim 11, wherein the fabric is a flat woven fabric.

15. The method of claim 11, wherein the predetermined gap is controlled by a mechanical stop.

16. The method of claim 11, wherein the welded seam area is stronger and/or more durable than a non-welded seam or a glued seam of equal length in MD of the fabric.

17. The method of claim 11, wherein a width of said seam area as measured in MD is a fraction of a width of a non-welded seam or a glued seam of equal strength, said fraction being 0.7 or lower, preferably 0.5 or lower, and most preferably 0.3 or lower.

18. An industrial fabric comprising:
    a plurality of warp yarns interwoven with a plurality of weft yarns; and
    a seam area wherein terminal yarn ends of one or more warp yarns and/or weft yarns are woven into the body of the fabric to place the fabric in an endless form, and wherein the terminal yarn ends in the seam area are welded to an adjacent yarn and/or to a yarn that the terminal yarn ends cross over using ultrasonic gap welding,
    wherein a depth of weld is determined by a predetermined gap between a horn and an anvil.

19. The fabric according to claim 18, wherein the fabric is selected from the group consisting of: PMC fabrics, TAD, engineered fabrics, fabrics/belts used for textile finishing processes such as calendering and hide tanning.

20. The fabric according to claim 8, wherein said seam is a pin scam or an inline spiral seam.

\* \* \* \* \*